March 5, 1929.  J. W. WELSH  1,704,232
OPHTHALMIC MOUNTING
Filed June 13, 1923

Inventor
James W. Welsh
by David Rines
Attorney

Patented Mar. 5, 1929.

1,704,232

UNITED STATES PATENT OFFICE.

JAMES WILSON WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed June 13, 1923. Serial No. 645,118.

The present invention relates to ophthalmic mountings.

One of the advantages claimed for ophthalmic mountings of the non-metallic type, and for some of those of the combined-metal-and-non-metallic type is the cushioning effect produced upon the lenses when the mounting falls to the ground, thereby tending to prevent breakage.

An object of the present invention is to provide such cushioning effect in mountings that have the appearance of the all-metal type.

To this end, a feature of the invention resides in providing the metal rim with an inner slot within which is hidden a non-metallic rim that contacts with the lens. The same cushioning effect is obtained as in non-metallic mountings, but no non-metallic material is visible.

Other and further objects will appear hereinafter.

With the above objects in view, the invention consists of the improved ophthalmic mounting hereinafter described, illustrated in the accompanying drawings and defined in the appended claims.

Figure 1:
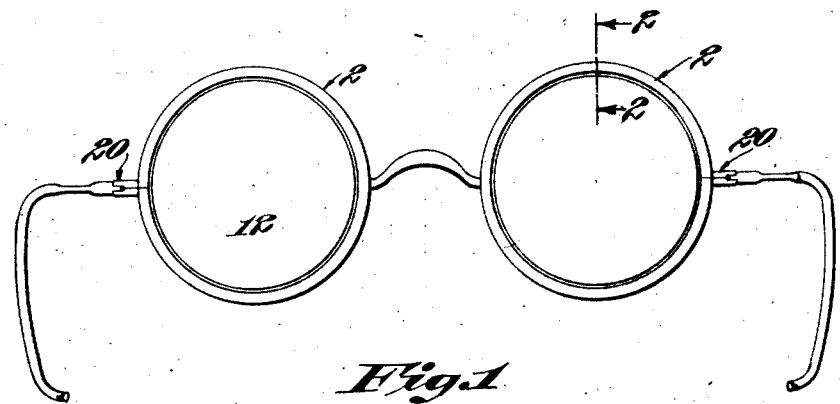
Figure 2:
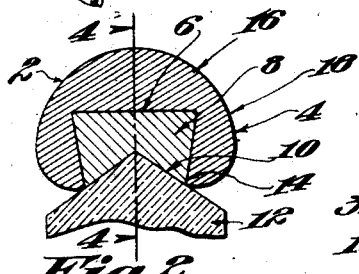
Figure 3:
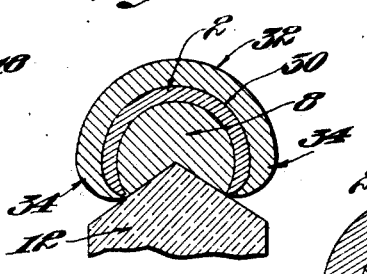
Figure 5:
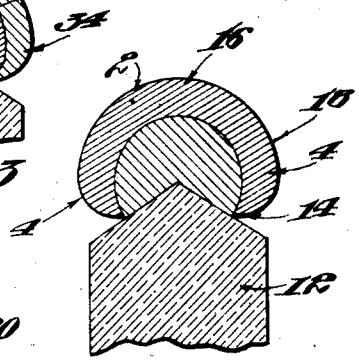
Figure 4:
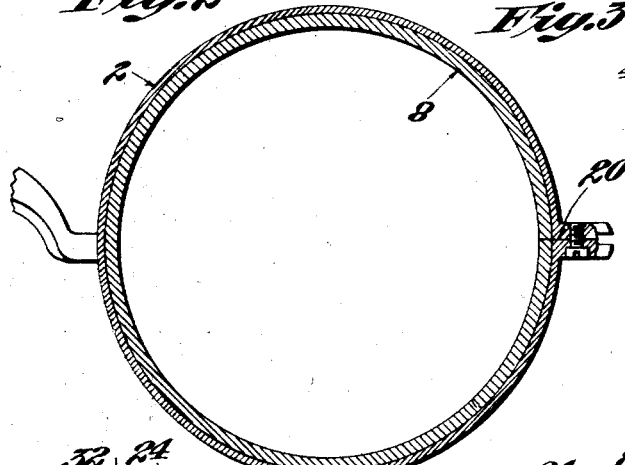

In the accompanying drawings, Fig. 1 is an elevation of a pair of spectacles constructed according to the present invention; Fig. 2 is a section taken upon the line 2—2 of Fig. 1; Fig. 3 is a similar section of a modification; Fig. 4 is a section taken upon the line 4—4 of Fig. 2; and Figs. 5, 6, 7 and 8 are sections similar to Figs. 2 and 3 of further modifications.

According to the preferred form of the present invention, spectacles, eyeglasses and the like are provided with outer metal rims 2 having annular wings 4 forming between them an inner annular slot 6. An inner non-metallic rim 8 is seated in the slot 6 so as to be enclosed between the wings 4, becoming thus hidden from view. The non-metallic rim 8 is provided with a groove 10 adapted to receive a lens 12. The lens is thus cushioned by the non-metallic material.

In order that the non-metallic rim may be held in place in the metal rim, it is preferred to have the annular slot 6 narrower at a position 14 comparatively far from the body 16 of the rim than at a position 18 comparatively near to the body of the rim. In the illustrated embodiments of the invention, the narrowest portions are at the mouth of the slot, but this is not essential. The walls of the slot near the mouth, or near the narrower portions of the slot wherever situated, engage the non-metallic rim, and the rims are thus held against separation. As the non-metallic material, which may be zylonite or any other substance, is usually resilient, the non-metallic rim may be readily sprung into the slot 6. The non-metallic rim may, however, be mounted in the slot 6 in other ways, as by sliding one rim into the slot of the other. Such sliding is easily rendered possible when the rims are split, as shown at 20.

Figure 6:
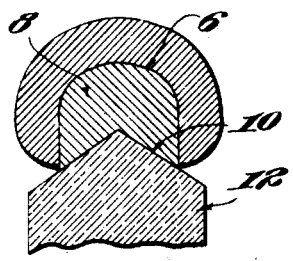

No interlocking of the rims is illustrated in Fig. 6, the non-metallic rim being simply seated in the slot of the metal rim. In Figs. 2, 3, 5, 7 and 8, the rims are locked against separation as just described. This is effected in the construction illustrated in Fig. 2 by having the slot 6 trapezoidal in cross section; in Figs. 3 and 5, by having the slot substantially circular in cross section; and in Figs. 7 and 8 by having the annular slot bounded by substantially parallel lines 22 that are joined together by a curve 24 that is of greater width between the points 26 and 28 than the distance between the parallel lines. These views are suggestive, but not exclusive, as other shapes will readily occur to persons skilled in the art.

Figure 7:
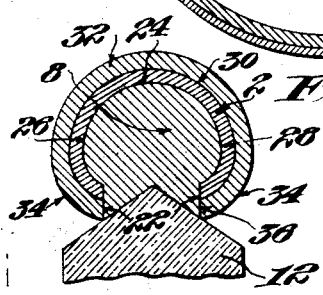
Figure 8:
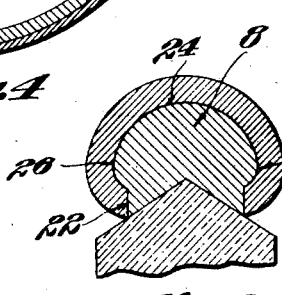

In some mountings of the combination-metal-and-non-metallic type, the metal rim is seated in a slot of the non-metallic rim, the advantages of the non-metallic material being thereby combined with the rigidity and other characteristics of the metal. This type of mounting may be produced, according to the present invention, by seating within a slot 30 of an outer non-metallic rim 32, the combined-metal-and-non-metallic rim heretofore described, as illustrated in Figs. 3 and 7. A combination-metal-and-non-metallic rim is thus produced the metal rim of which is seated within an inner slot of the non-metallic rim, and in which the lens is nevertheless cushioned by seating against non-metallic material 8. The intermediately positioned metal rim 2 imparts rigidity to the structure, the inner non-metallic rim 8 cushions the lens, and the outer non-metallic rim 32 gives to the mounting the non-metallic appearance desired by the wearer. Here, again, the wings 34 of the non-metallic rim may be so shaped, and the cross-sectional conformation of the slot 30 so designed, as to enclose and hold enclosed both the metal rim 2 and the non-metallic rim 8.

If desired, the non-metallic rims 8 and 32 may be caused to come into contact, as illustrated at 36, Fig. 7, and a cement applied to unite the contacting parts together. The rims 8 and 32 would thus become integrally united into a single whole, with a metal reinforcing rim 2 enclosed between them.

Other applications of this invention will occur to persons skilled in the art, and are considered to fall within the spirit and scope of the present invention. It is therefore desired that the appended claims be broadly construed, unlimited except in so far as limitations may be imposed by the prior art.

What is claimed is:

1. An ophthalmic mounting having, in combination, an outer metal rim having annular wings forming between them an inner annular slot, and an inner non-metallic rim seated in the slot and enclosed between the wings of the metal rim, whereby the mounting has the appearance of the all-metal type, and the non-metallic rim having a lens-receiving groove, whereby the mounting has the lens-cushioning effect of the non-metallic type.

2. An ophthalmic mounting having, in combination, a metal rim having annular wings forming between them an annular slot that is narrower at a position comparatively far from the body of the rim than at a position comparatively near to the body of the rim, and a non-metallic rim seated in the slot, the walls of the slot near the narrower portions engaging the non-metallic rim to hold the rims against separation, and one of the rims having a lens-receiving groove.

3. An ophthalmic mounting having, in combination, an outer metal rim having annular wings forming between them an inner annular slot that is narrower at a position comparatively far from the body of the rim than at a position comparatively near to the body of the rim, and an inner non-metallic rim seated in the slot and enclosed between the wings, the walls of the slot near the narrower portions engaging the non-metallic rim to hold the rims against separation, and the non-metallic rim having a lens-receiving groove.

4. An ophthalmic mounting as defined in claim 3 in which the annular slot of the metal rim is substantially circular in cross section.

5. An ophthalmic mounting as defined in claim 3 in which the annular slot of the metal rim is bounded in cross section by substantially parallel lines that are joined together by a curve of greater width than the distance between the parallel lines.

6. An ophthalmic mounting having, in combination, an outer metal rim having an inner slot, and an inner non-metallic rim hidden in the slot, whereby the mounting has the appearance of the all-metal type, and the non-metallic rim having a lens-receiving groove, whereby the mounting has the lens-cushioning effect of the non-metallic type.

In testimony whereof, I have hereunto subscribed my name this 2d day of June, 1923.

JAMES WILSON WELSH.